United States Patent
Nakazawa et al.

(10) Patent No.: US 6,592,803 B2
(45) Date of Patent: Jul. 15, 2003

(54) PROCESS FOR PRODUCING BELT-SHAPED MEMBER FROM A DIE-EXTRUDED FILM HAVING A FILM THICKNESS, DIE GAP RELATIONSHIP

(75) Inventors: Akihiko Nakazawa, Sunto-gun (JP); Hiroyuki Kobayashi, Fuji (JP); Minoru Shimojo, Kawasaki (JP); Akira Shimada, Sunto-gun (JP); Atsushi Tanaka, Susono (JP); Tsunenori Ashibe, Yokohama (JP); Takashi Kusaba, Sunto-gun (JP); Hidekazu Matsuda, Numazi (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 09/750,165

(22) Filed: Dec. 29, 2000

(65) Prior Publication Data

US 2002/0006573 A1 Jan. 17, 2002

(51) Int. Cl.$^7$ .............................................. B29C 49/04
(52) U.S. Cl. .................... 264/564; 264/150; 264/209.1; 264/171.26
(58) Field of Search ................................. 264/564, 150, 264/171.26, 171.27, 209.1, 209.4, 209.5

(56) References Cited

U.S. PATENT DOCUMENTS

| | | | |
|---|---|---|---|
| 5,256,512 A | 10/1993 | Kobayashi et al. | |
| 5,258,811 A | 11/1993 | Miyake et al. | |
| 5,552,005 A | 9/1996 | Mammino et al. | |
| 5,842,080 A | 11/1998 | Ashibe et al. | |
| 5,995,794 A | 11/1999 | Osada et al. | |
| 6,139,784 A | 10/2000 | Oshima et al. | |
| 6,141,513 A | 10/2000 | Nishiuwatoko et al. | |
| 6,303,072 B1 * | 10/2001 | Kobayashi et al. | 264/564 |

FOREIGN PATENT DOCUMENTS

| | | |
|---|---|---|
| JP | 63-301960 | 12/1988 |
| JP | 3-89357 | 4/1991 |
| JP | 5-77252 | 3/1993 |
| JP | 5-269849 | 10/1993 |
| JP | 5-345368 | 12/1993 |
| JP | 9-269674 | 10/1997 |

OTHER PUBLICATIONS

Computer Translation of JP 5345368 A from www.ipdl.j-po.go.jp/homepg_e.ipdl.*

* cited by examiner

Primary Examiner—Mark Eashoo
Assistant Examiner—Geoffrey P. Shipsides
(74) Attorney, Agent, or Firm—Fitzpatrick, Cella, Harper & Scinto

(57) ABSTRACT

A process produces a belt-shaped member to be used in an image-forming apparatus is disclosed in which a toner image held on a latent-image-bearing member is electrostatically transferred under application of a voltage via the belt-shaped transfer member. The process includes the steps of melt-extruding a material containing a thermoplastic resin, from a circular die into a cylindrical film; forming the resultant cylindrical film by stretching in such a way that the cylindrical film comes to have a thickness smaller than the die gap of the circular die; and cutting the cylindrical film thus formed, into a seamless belt having a thickness of from 40 $\mu$m to 300 $\mu$m and a modulus in tension of 600 MPa or higher. The stretched cylindrical film is formed to have a thickness not larger than 1/3 of the die gap of the circular die. A belt-shaped transfer member may be produced by the above-described process. The so-produced belt-shaped transfer member is usable as a transfer belt in an image-forming apparatus in which a toner image held on a latent-image-bearing member is electrostatically transferred under application of a voltage via the belt-shaped transfer member.

13 Claims, 6 Drawing Sheets

PROCESS FOR PRODUCING BELT-SHAPED MEMBER FROM A DIE-EXTRUDED FILM HAVING A FILM THICKNESS, DIE GAP RELATIONSHIP

BACKGROUND OF THE INVENTION

1. Field of the Invention

This invention relates to a process for producing a belt-shaped member such as an intermediate transfer belt or a transfer material transport belt, used for electrophotography, and also relates to a belt-shaped transfer member produced by the production process, and an image-forming apparatus using the belt-shaped transfer member.

2. Related

Compared with an image-forming apparatus in which toner images are transferred from a first image bearing member (latent image bearing member) to a transfer material (such as paper) fastened or attracted onto a transfer drum (Japanese Application Laid-open No. 63-301960), an image-forming apparatus making use of intermediate transfer belts has such an advantage that a variety of transfer materials can be selected without regard to their width and length, including thin paper (40 g/m$^2$ paper) and thick paper (up to 200 g/m$^2$ paper) such as envelopes, post cards and labels.

Such an image-forming apparatus can also dramatically be improved in printing speed by using the first image-bearing member, a charging means, a developing means and so forth for each color developer and also using the intermediate transfer belt and the transfer material transport belt which attracts and transports transfer materials.

Full-color copying machines and printers making use of such a belt-shaped transfer member have various advantages as stated above. On the other hand, they also have some aspects for improvement.

As one of them, belt-shaped transfer members are necessarily large in size and also required to have various properties such as electrical resistance and surface properties, tending to result in high production costs. With regard to durability, too, some are not necessarily satisfactory and tend to have to be frequently changed for new ones. As a result, this may raise the main-body price and running costs of copying machines and printers and also it may take more labor and time for their maintenance. In particular, because of marketing trends in recent years, it has increasingly become important to achieve a lower price and provide maintenance-free articles.

In order to form good color images, some other problems must also be solved which may occur because a plurality of different colors are superimposed on the belt-shaped transfer member.

One of them is misregistration which may occur between individual colors. In fine lines and character images, even slight color misregistration tends to be conspicuous to provide a possibility of damaging image quality. When the belt-shaped transfer member is used, it must be put over a plurality of shafts, where the tension applied to every part of the transfer member is not necessarily uniform when driven and rotated. Hence, the belt-shaped transfer member tends to undergo local elongation and, concurrently therewith, may cause delicately uneven rotation. As a result, delicate color misregistration may appear when colors are superimposed, as so presumed.

Another problem is occurrence of spots around line images. This problem may seriously occur in image-forming apparatus in which toner images of different colors are superimposed on an intermediate transfer member and then collectively transferred to a transfer material. Superimposing different color toners enlarges the quantity of developer per unit area than in the case of monochromatic images. Especially in characters and fine lines, toners are present in a large quantity on narrow lines. Moreover, individual color toners have electric charges with the same polarity, and hence they are electrostatically repulsive to each other. Thus, it can be said that the toners are on the intermediate transfer belt in an unstable state.

Meanwhile, because of a difference in arcs drawn by the outer surface and inner surface of the intermediate transfer belt, produced when it passes through each shaft over which it is put, the intermediate transfer belt is elongated in the peripheral direction at its surface and in the vicinity thereof. Hence, the toner images standing unstable and weak to external disturbance as stated above are disordered because of such surface elongation of the intermediate transfer belt when it passes through the shafts, so that the spots around line images come to occur, as so presumed.

Still another problem is transfer performance of halftone toner images. Faulty images tend to occur when the belt-shaped transfer member has any uneven electrical resistance or uneven wall thickness.

Thus, there is room for further studies in order to obtain images with higher image quality. For the achievement of cost reduction, materials constituting the belt-shaped transfer member must be reduced in quantity to make them thin-gauge, and also a production process having a smaller number of steps must be provided. Making the belt thin-gauge also has the effect on prevention of the spots around line images caused by transfer, and is an effective means, but on the other hand the belt-shaped transfer member tends to be more elongated and also to raise a problem regarding durability.

Various processes for producing belts and tubes used for intermediate transfer members and so forth are already known in the art. For example, Japanese Patent Application Laid-Open No. 3-89357 and No. 5-345368 disclose a process for producing a semiconducting belt by extrusion. Japanese Patent Application Laid-open No. 5-269849 also discloses a process in which a belt is obtained by joining both ends of a sheet to bring it into a cylindrical form. Japanese Patent Application Laid-open No. 9-269674 discloses a process in which a belt is obtained by forming a multi-layer coating film on a cylindrical substrate and finally removing the substrate. Japanese Patent Application Laid-open No. 5-77252 discloses a seamless belt obtained by centrifugal molding.

The above processes each have merits and demerits. For example, in the extrusion, setting the die gap of an extruder die in the same size as the desired belt thickness involves considerable difficulties for producing thin-layer belts that can achieve the cost reduction and can control the occurrence of the spots around line images, tending to cause uneven wall thickness and uneven electrical resistance affected by such thickness. In the case where both ends of a sheet are joined, the difference in height and decrease in tensile strength at the joint presents problems. Still also, processes making use of solvents as in cast molding, coating and centrifugal molding require many steps of preparing and applying a coating solution, and removing the solvent, resulting in a high cost.

SUMMARY OF THE INVENTION

Accordingly, the present inventors propose a novel belt-shaped transfer member that is different from any conventional ones, having solved the above problems.

More specifically, an object of the present invention is to provide a process for producing a belt-shaped transfer member at a lower cost, in a smaller number of steps and in a rich variety of forms, and also provide a belt-shaped transfer member obtained by such a production process, and an image-forming apparatus having the belt-shaped transfer member.

Another object of the present invention is to provide a process for producing a belt-shaped transfer member which can contribute to the formation of good color images having less color misregistration and less spots around line images, and also provide a belt-shaped transfer member obtained by such a production process, and an image-forming apparatus having the belt-shaped transfer member.

Still another object of the present invention is to provide a process for producing a belt-shaped transfer member which can be free of any changes in its characteristics and can maintain characteristics at the same level as those at the initial stage, and also provide a belt-shaped transfer member obtained by such a production process, and an image-forming apparatus having the belt-shaped transfer member.

The present invention provides a process for producing a belt-shaped member usable as a transfer member (sometimes referred to herein as a "belt-shaped transfer member") in an image-forming apparatus in which a visible image formed by developing with a developer an electrostatic latent image formed on a latent-image-bearing member is electrostatically transferred under application of a voltage via the belt-shaped transfer member; the process comprising the steps of;

melt-extruding a material containing a thermoplastic resin, from a circular die into a cylindrical film;

forming the resultant cylindrical film by stretching in such a way that the cylindrical film comes to have a thickness smaller than the die gap of the circular die; and cutting the cylindrical film thus formed, into a seamless belt having a thickness of from 40 μm to 300 μm and a modulus in tension of 600 MPa or higher.

The present invention also provides a belt-shaped member usable as a transfer member in an image-forming apparatus in which a visible image formed by developing with a developer an electrostatic latent image formed on a latent-image-bearing member is electrostatically transferred under application of a voltage via the belt-shaped transfer member; the belt-shaped transfer member comprising a seamless belt having a thickness in a range of 40 μm to 300 μm and a modulus in tension of 600 MPa or higher, which is produced by;

melt-extruding a material containing a thermoplastic resin, from a circular die into a cylindrical film;

forming the resultant cylindrical film by stretching in such a way that the cylindrical film comes to have a thickness smaller than the die gap of the circular die; and cutting into the seamless belt the cylindrical film thus formed.

The present invention still also provides an image-forming apparatus having the above belt-shaped transfer member.

DESCRIPTION OF THE PREFERRED EMBODIMENTS

Figure 1:
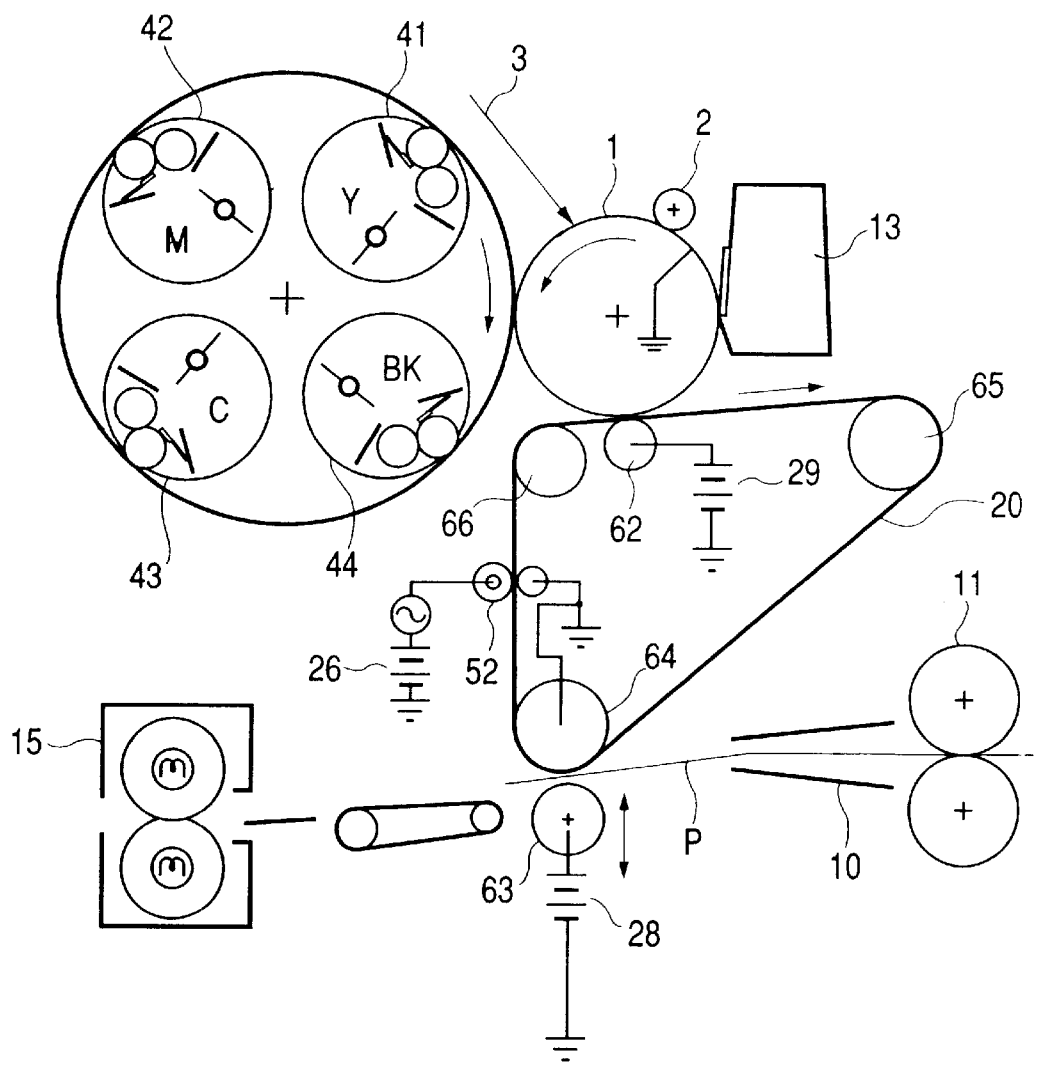
FIG. 1 schematically illustrates the construction of an image-forming apparatus according to the present invention.

The belt-shaped member of the present invention usable as a transfer member in an image-forming apparatus in which a visible image formed by developing with a developer an electrostatic latent image formed on a latent-image-bearing member is electrostatically transferred under application of a voltage via the belt-shaped transfer member. It has a seamless belt having a thickness in a range of 40 μm to 300 μm and a modulus in tension of 600 MPa or higher, which is produced by melt-extruding a material containing a thermoplastic resin, from a circular die into a cylindrical film; forming the resultant cylindrical film by stretching (herein meant to embrace stretching by "blowing" shown in FIG. 4 and "drawing" shown in FIG. 5) in such a way that the cylindrical film comes to have a thickness smaller than the die gap of the circular die; and cutting into the seamless belt the thus-formed cylindrical film into a seamless belt.

According to the present invention, the belt-shaped member can be produced continuously, and hence the production cost can very highly effectively be reduced. Also, the material is extruded and simultaneously stretched (by blowing or drawing) to make the extruded film thin-gauge. This brings about cooperative effects of cost reduction attributable to the reduction of materials used, improvement in strength attributable to the effect of stretching or blowing, and less uneven thickness and uneven electrical resistance, so that the problems stated above can be solved. In particularly, with regard to the color misregistration and spots around line images, the achievement of thin-gauge belt formation and the improvement in a modulus in tension bring about a great effect for the improvements.

The seamless belt used in the belt-shaped transfer member of the present invention must have a wall thickness within the range of 40 to 300 μm. In a thickness smaller than 40 μm, the seamless belt may lack forming stability to tend to cause uneven thickness, and also may have an insufficient strength to cause break or cracking of the belt-shaped transfer member in some cases. On the other hand, in a thickness larger than 300, materials must be used in a large quantity, resulting in a high cost, and moreover the belt-shaped transfer member may have at its put-over-shaft portion (a portion at which it is put against a shaft) a great difference in peripheral speed between the outer surface and the inner surface, tending to cause spots around line images seriously. Furthermore, the belt-shaped transfer member may have so high a rigidity as to cause an increase in drive torque, where problems may arise such that the main body must be made larger in size and requires a high cost.

The seamless belt must also have a modulus in tension of 600 MPa or higher, and preferably 700 MPa or higher, in order to prevent the spots around line images from being caused by local elongation of the belt-shaped transfer member or flexural stress at its put-over-shaft portion, and may furmore preferably have a modulus in tension of 2,000 MPa or higher, and particularly preferably 2,500 MPa or higher. At a modulus in tension lower than 600 MPa, the belt-shaped transfer member tends to elongate, tending to cause color misregistration and spots around line images even at the initial stage. Moreover, its repeated use for a long term may cause creep to bring about a phenomenon that the belt gradually comes to have a larger peripheral length, resulting in many problems such that images deteriorate seriously as a result of running (or extensive operation) and the belt-shaped transfer member must frequently be changed for new one. From the viewpoint of travel stability, its modulus in tension may preferably be not higher than 4,000 MPa. Also, the modulus in tension is affected by various factors such as a type of resin used, a type and quantity of additive and also the manner of stretching. In the present invention, however, it is important for the belt to satisfy physical properties specified in the present invention, and there are no particular limitations on the means by which the modulus in tension is achieved.

The belt-shaped transfer member may also preferably be put over shafts at a certain degree of tension in order to obtain stable images free of color misregistration. Stated specifically, it may preferably be done at a tension of 0.5 N or higher and, in particular, 10 N or lower, and more preferably from 0.7 N to 10 N, per 1 cm of the width of the belt-shaped transfer member. In order to maintain initial-stage image quality in the state that such a tension is applied, too, the seamless belt must have the wall thickness in a range of 40 to 300 μm and the modulus in tension of 600 MPa.

An embodiment of the production process of the present invention will be described below. This embodiment by no means limits the present invention.

Figure 4:
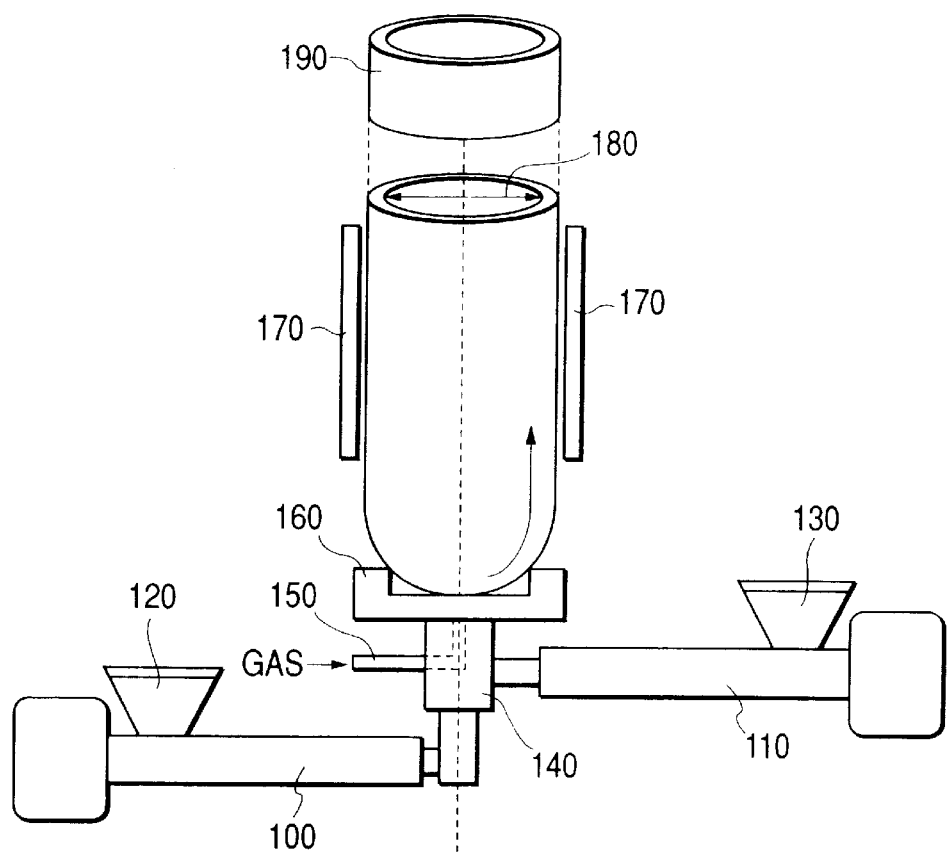
FIG. 4 schematically illustrates the construction of an extrusion/forming apparatus.

FIG. 4 shows an example of an extrusion/forming apparatus according to the present invention. This apparatus consists basically of an extruder, a circular die and a gas blowing unit.

As shown in FIG. 4, the apparatus has two sets of extruders 100 and 110 so that a belt of double-layer configuration can be extruded. In the present invention, however, at least one extruder may be provided. A single-layer belt-shaped transfer member can be produced by a process described below.

First, an extrusion thermoplastic resin and optionally a conducting agent and additives are premixed under the desired formulation and thereafter kneaded and dispersed to prepare an extrusion material, which is then put into a hopper the extruder 100 has. The extruder 100 has a preset temperature, extruder screw construction and so forth which have been so selected that the extrusion material may have a melt viscosity necessary for its extrusion into a belt in the later step and also the materials constituting the extrusion material can be dispersed uniformly. Next, the extrusion material is melt-kneaded in the extruder 100 into a melt, which then enters an circular die 140. The circular die 140 is provided with a gas inlet passage 150. Through the gas inlet passage 150, a gas is blown into the circular die 140, whereupon the melt having passed through the circular die 140 in a tubular form inflates while being scaled up in the diametrical direction. The gas to be blown may be selected from air, and besides nitrogen, carbon dioxide and argon.

The extruded product having thus inflated into a cylinder is drawn upward while being cooled by a cooling ring 160. At this stage, the extruded product passes through the space defined by a dimension stabilizing guide 170, so that its final shape and dimensions are determined. This product is further cut in a desired width, thus a seamless belt-shaped transfer member 190 of the present invention can be obtained. The product may preferably be cut in the direction of substantially right angles to the cylindrical film.

In the case where a seamless belt of double-layer configuration is produced, the extruder 110 is provided in addition to the extruder 100 as shown in FIG. 4. Simultaneously with the kneaded melt in the extruder 100, a kneaded melt in the extruder 110 is sent to a double-layer circular die 140, and the two layers are scale-up inflated simultaneously. Reference numeral 130 denotes a hopper.

Figure 6:
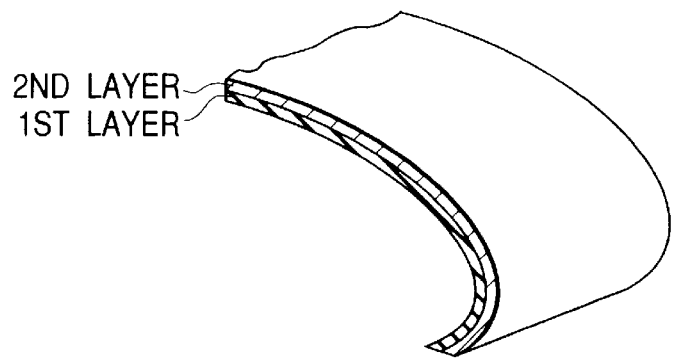
FIG. 6 illustrates part of an intermediate transfer belt having a double-layer configuration.
Figure 7:
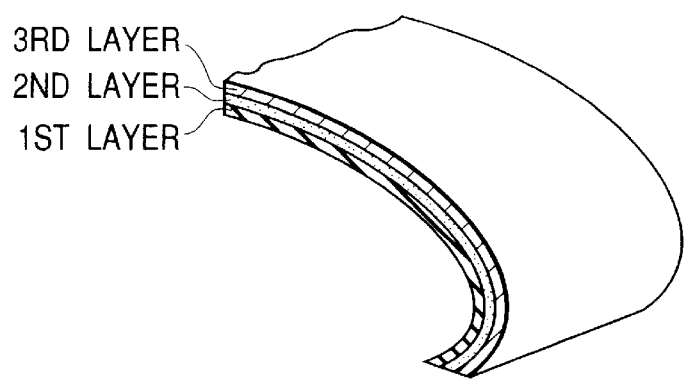
FIG. 7 illustrates part of an intermediate transfer belt having a triple-layer configuration.
Figure 8:
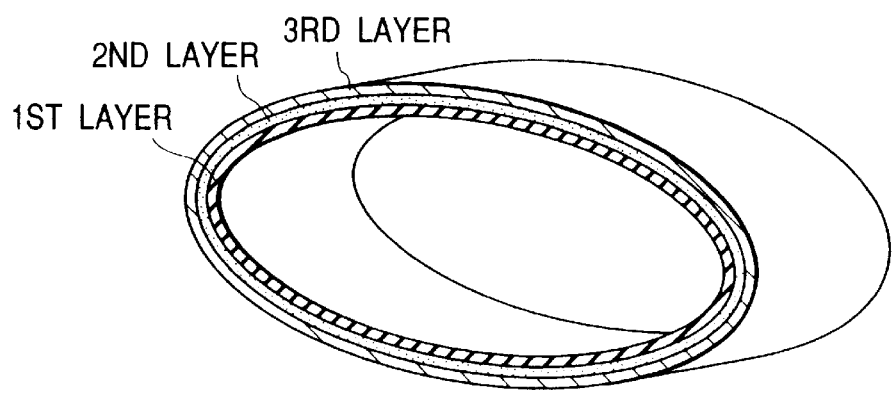
FIG. 8 illustrates the whole of the intermediate transfer belt having a triple-layer configuration.

Of course, in the case of triple or more layers, the extruder and the extruder die may be provided in the number corresponding to the number of layers. Examples of the belt-shaped transfer member of a double-layer configuration and triple-layer configuration are shown in FIGS. 6 to 8. Thus, the present invention makes it possible to extrude not only belt-shaped transfer members of single-layer configurations but also those of multi-layer configurations in good dimensional precision through one step and also in a short time. The fact that this extrusion can be made in a short time well suggests that mass production and low-cost production can be realized.

In the case of the multi-layer configuration, at least one layer may satisfy the physical properties specified in the present invention. More preferably, all the layers may satisfy the physical properties specified in the present invention.

Figure 5:
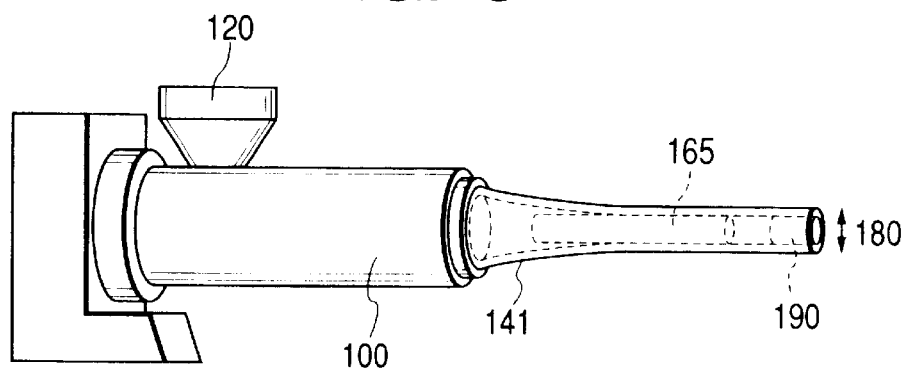
FIG. 5 schematically illustrates the construction of another extrusion/forming apparatus.

FIG. 5 shows another belt-shaped transfer member production process according to the present invention. The extrusion material put into a hopper 120 is melt-kneaded in an extruder 100 and extruded from a circular die 141. The melt thus excluded into a cylinder is stretched while being tensed by a take-off mechanism (not shown) provided on the extension line of a cooling mandrel 165. It comes into contact with the inner wall of the cooling mandrel 165 in the form of a cylindrical film having substantially the desired thickness and diameter, to become cool and solidify, followed by cutting. Thus, a seamless belt-shaped transfer member 190 of the present invention can be obtained.

In the belt-shaped transfer member production process of the present invention, the desired physical properties are attained by, e.g., after the extrusion, scale-up inflating the cylindrical extruded film while blowing a gas thereinto, or taking off the cylindrical film at a speed higher than the speed of extrusion.

The cylindrical film obtained by extrusion is simultaneously subjected to forming by stretching (by blowing or drawing) in such a way that the cylindrical film comes to have a thickness smaller than the die gap of the circular die, i.e., in a specific ratio of the die gap to the film thickness. The ratio of the cylindrical die gap to the thickness of the cylindrical film having been subjected to forming is a comparison of the thickness of the cylindrical film with the width of the gap (slit) of the circular die, and the former may preferably be not larger than ⅓, and particularly preferably not larger than ⅕, of the latter as a thickness ratio.

Similarly, a diameter proportion between the circular die and the cylindrical film having been subjected to forming is a proportion of external diameter of the cylindrical film at the time it has reached a shape dimension 180 after forming, with respect to external diameter of the die slit of the circular die 140 or 141 and is expressed by percent. It may preferably be within the range of from 50% to 400%. To find the external diameter of the cylindrical film formed, the film may be cut at its one end, and its length may be measured with a slide caliper.

These values represent the state of stretch of the material. If the thickness ratio is larger than 1/3, the film tends to stretch insufficiently, tending to cause the matter such as low strength, uneven resistance and uneven thickness. As for the external diameter proportion, if it is more than 400% or less than 50%, the film has stretched in excess, resulting in a low production stability or making it difficult to ensure the thickness necessary for the present invention.

The extrusion material used in the present invention may preferably have a breaking extension of 2.0% or more and a tensile breaking strength of 30 MPa or above. If the material has a breaking extension less than 2.0%, the extruded product may instantaneously solidify when it is shifted to a cooling step from a molten state after it has passed through the step of extrusion, so that it may be difficult to attain the desired physical properties. Also, if the material has a tensile breaking strength below 30 MPa, the extruded product may have no body and can not maintain the cylindrical shape at the time of scale-up inflation, tending to cause wrinkles, strain and unevenness when it is drawn upward while being scale-up inflated as shown in FIG. 4.

The uniformity of electrical resistance of the belt-shaped transfer member of the present invention and electrical resistance of the interior of the belt are important factors for maintaining the performance of the belt-shaped transfer member. In the case of the intermediate transfer belt, if the transfer belt has a too high electrical resistance, a sufficient transfer electric field can not be imparted at the time of primary transfer and secondary transfer, resulting in faulty transfer. If on the other hand it has a too low electrical resistance, electrical discharge may locally occur, also making it unable to form the transfer electric field. Also, if the resistance in the belt is nonuniform, the local electrical discharge, i.e., a leak may occur, and electric currents applied at the time of primary transfer and secondary transfer may escape therethrough to make it unable to obtain the necessary transfer electric field.

Accordingly, in the present invention, the belt-shaped transfer member may preferably have a resistance in a range of $1 \times 10^0$ to $10^{14}$ $\Omega$. In order to prevent such discharge, faulty transfer and local uneven transfer from occurring, the difference in resistance at every part of the belt-shaped transfer member may preferably be within 100 times in respect of both surface resistance and volume resistance.

The resin (thermoplastic resin) which is the chief material of the extrusion material used to produce the belt-shaped transfer member of the present invention may include, e.g., styrene resins (homopolymers or copolymers containing styrene or substituted styrene) such as polystyrene, polychlorostyrene, poly-α-methylstyrene, styrene-butadiene copolymer, styrene-vinyl chloride copolymer, styrene-vinyl acetate copolymer, styrene-maleic acid copolymer, styrene-acrylate copolymers (such as styrene-methyl acrylate copolymer, styrene-ethyl acrylate copolymer, styrene-butyl acrylate copolymer, styrene-octyl acrylate copolymer and styrene-phenyl acrylate copolymer), styrene-methacrylate copolymers (such as styrene-methyl methacrylate copolymer, styrene-ethyl methacrylate copolymer and styrene-phenyl methacrylate copolymer), styrene-α-methyl chloroacrylate copolymer and styrene-acrylonitrile-acrylate copolymer; methyl methacrylate resin, butyl methacrylate resin, ethyl acrylate resin, butyl acrylate resin, modified acrylic resins (such as silicone-modified acrylic resin, vinyl chloride resin modified acrylic resin and acryl-urethane resin), vinyl chloride resin, styrene-vinyl acetate copolymer, vinyl chloride-vinyl acetate copolymer, rosin-modified maleic acid resin, phenol resins, epoxy resins, polyester resins, polyester polyurethane resins, polyethylene, polypropylene, polybutadiene, polyvinylidene chloride, ionomer resins, polyurethane resins, silicone resins, fluorine resins, ketone resins, ethylene-ethylacrylate copolymer, and xylene resins; and polyvinyl butyral resins, polyimide resins, polyamide resins, and modified polyphenylene oxide resins. One or more types selected from the group consisting of these may be used. Examples are by no means limited to the foregoing materials.

In order to control the electrical resistance of the belt-shaped transfer member of the present invention, a conductive agent may further be added as long as the physical properties required in the present invention are not impaired. Carbon black is commonly used, but is not necessarily limited to it, provided that, whatever conductive agent is used, it may preferably be added in an amount not more than 30% by weight based on the weight of the resin, taking account of extrusion or forming performance and mechanical properties of the belt-shaped transfer member. There is also a method in which the electrical resistance is controlled by the resin material itself. In such a case, it may be added in an appropriate amount without being limited to the above amount.

As the latent-image-bearing member, a photosensitive drum containing fine powder of polytetrafluoroethylene (PTFE) in at least its outermost layer may preferably be used because a higher transfer efficiency can be achieved. This is presumably because the incorporation of PTFE lowers surface energy of the photosensitive drum outermost layer to bring about an improvement of releasability of the toner.

Methods of measuring physical properties concerning the present invention are shown below.

Measurement of Thickness:

The wall thickness of the belt-shaped transfer member of the present invention is measured with a dial gauge measurable by 1 μm as a minimum value, over the whole periphery of the cylindrical belt at its positions of 50 mm from the both ends and in the peripheral direction at intervals of 20 mm.

Measurement of Mechanical Strength:

Modulus in Tension (Young's Modulus)

A sample for measurement is prepared in a size 100 mm long and 20 mm wide, which is cut directly out of the belt-shaped transfer member with a sharp-edged tool. Here, it is so cut as to be 100 mm in the peripheral direction. Thickness of the measuring sample is measured on five spots in the vicinity of its middle area to take an average, which is regarded as the sample thickness. Cross-sectional area A (mm$^2$) is found from the sample width 20 mm and thickness.

Next, this sample is set on a tensile tester TENSILON TC-1250A (manufactured by Orientec Co.). The sample thus set is pulled at a measurement distance of 50 mm and a test speed of 5 mm/min, and tension f (N) is read when the sample is elongated by 1% of the measurement distance. From the value thus read, modulus in tension E (MPa) is determined from these values according to the following equation.

$\sigma = f/A$ $E = \sigma/\epsilon$ wherein;
 σ: Stress at 1% elongation (MPa)
 f: Tension at 1% elongation (N)
 A: Sample cross-sectional area (mm$^2$)
 ε: Deformation (elongation)=0.01
 E: Modulus in tension (MPa)

The foregoing is operated on five samples, and their average value is regarded as the modulus in tension of the belt-shaped transfer member in the present invention.

The other tensile breaking strength is measured according to JIS K7113 and JIS K7127, in conformity with the nature of the extrusion material and the resin used in the extrusion material.

Measurement of Electrical Resistance:

As measuring instruments, an ultra-high resistance meter R8340A (manufactured by Advantest Co.) is used as a resistance meter, and Sample Box TR42 for ultra-high resistance measurement (manufactured by Advantest Co.) as a sample box. Its main electrode is 25 mm in diameter, and a guard-ring electrode is 41 mm in inner diameter and 49 mm in outer diameter.

A sample is prepared in the following way. First, the belt-shaped transfer member is cut in a circle of 56 mm in diameter by means of a punching machine or a sharp-edged tool. The circular cut piece obtained is fitted, on its one side, with an electrode over the whole surface by forming a Pt—Pd deposited film and, on the other side, fitted with a main electrode of 25 mm in diameter and a guard electrode of 38 mm in inner diameter and 50 mm in outer diameter by forming Pt—Pd deposited films. The Pt—Pd deposited films are formed by carrying out vacuum deposition for 2 minutes using Mild Sputter E1030 (manufactured by Hitachi Ltd.). The one on which the vacuum deposition has been carried out is used as a measuring sample.

Measured in a measurement atmosphere of 23° C./55% RH. The measuring sample is previously left standing in the like atmosphere for 12 hours or longer. Measurement is made under a mode of discharge for 10 seconds, charge for 30 seconds and measurement for 30 seconds and at an applied voltage of 1 to 1,000 V.

The applied voltage may arbitrarily be selected within the range of from 1 to 1,000 V which is part of the range of the voltage applied to the belt-shaped transfer member used in the image forming apparatus of the present invention. The applied voltage may timely be changed within the above range of applied voltage, in accordance with the resistance value, thickness and insulation breakdown strength of the sample. Also, as long as the volume resistance and surface resistance at a plurality of spots, measured at any one-point voltage of the above applied voltage, is included in the resistance range defined in the present invention, the resistance is judged to be within the resistance range intended in the present invention. The volume resistance in the present invention is not volume resistivity (Ω·cm) on the basis of sample thickness, but volume-direction (thickness-direction) resistance value (Ω) obtained by actual measurement.

An example of an image forming apparatus employing the belt-shaped transfer member of the present invention as an intermediate transfer member is schematically shown in FIG. 1.

The apparatus shown in FIG. 1 is a full-color image-forming apparatus (copying machine or laser beam printer) utilizing an electrophotographic process.

Reference numeral 1 denotes a drum-shaped electrophotographic photosensitive member (hereinafter "photosensitive drum") serving as a first image bearing member (latent-image-bearing member), which is rotated at a prescribed peripheral speed (process speed) in the direction of an arrow.

The photosensitive drum 1 is, in the course of its rotation, uniformly charged to prescribed polarity and potential by means of a primary charging assembly 2, and then exposed to light 3 by a exposure means (not shown; e.g., a color-original image color-separating/image-forming exposure optical system, or a scanning exposure system comprising a laser scanner that outputs laser beams modulated in accordance with time-sequential electrical digital pixel signals of image information). Thus, an electrostatic latent image is formed which corresponds to a first color component image (e.g., a yellow color component image) of the intended color image.

Next, the electrostatic latent image is developed with a first-color yellow toner Y by means of a first developing assembly (yellow color developing assembly 41). At this stage, second to fourth developing assemblies (magenta color developing assembly 42, cyan color developing assembly 43 and black color developing assembly 44) each stand unoperated and do not act on the photosensitive drum 1, and hence the first-color yellow toner image is not affected by the second to fourth developing assemblies.

An intermediate transfer belt 20 is rotated at a prescribed peripheral speed in the direction of an arrow. The first-color yellow toner image formed and held on the photosensitive drum 1 passes through a nip formed between the photosensitive drum 1 and the intermediate transfer belt 20, in the course of which it is successively intermediately transferred to the periphery of the intermediate transfer belt 20 (primary transfer) by the aid of an electric field generated by a primary transfer bias applied to the intermediate transfer belt 20 through a primary transfer roller 62.

The photosensitive drum 1 surface from which the first-color yellow toner image has been transferred is cleaned by a cleaning assembly 13.

Subsequently, the second-color magenta toner image, the third-color magenta toner image and the fourth-color black toner image are sequentially similarly transferred and superimposed onto the intermediate transfer belt 20. Thus, the intended full-color toner image is formed.

Reference numeral 63 denotes a secondary transfer roller, which is provided in such a way that it is axially supported in parallel with a secondary transfer opposing roller 64 and stands separable from the bottom surface of the intermediate transfer belt 20.

The primary transfer bias for sequentially superimposition-transferring the first- to fourth-color toner images from the photosensitive drum 1 to the intermediate transfer belt 20 is applied from a bias source 29 having a polarity (+) reverse to that of each toner. The voltage thus applied is, e.g., in the range of from +100 V to +2 kV.

The full-color toner images formed on the intermediate transfer belt 20 are transferred to a second image bearing member, transfer material P, in the following way: The secondary transfer roller 63 is brought into contact with the intermediate transfer belt 20 and simultaneously the transfer material P is fed at a prescribed timing from a paper feed roller 11 through a transfer material guide 10 until it reaches a contact zone formed between the intermediate transfer belt 20 and the secondary transfer roller 63, where a secondary transfer bias is applied to the secondary transfer roller 63 from a power source 28. The transfer material P to which the toner images have been transferred are guided into a fixing assembly 15 and are heat-fixed.

After the toner images have been transferred to the transfer material P, a charging member 52 for cleaning is brought into contact with the intermediate transfer belt 20, and a bias with a polarity reverse to that of the photosensitive drum 1 is applied, whereupon electric charges with a polarity reverse to that of the photosensitive drum 1 are imparted to toners not transferred to the transfer material P and remaining on the intermediate transfer belt 20 (i.e., transfer residual toners). Reference numeral 26 denotes a bias power source, and reference numerals 65 and 66 denote rollers over which the intermediate transfer belt 20 is put.

The transfer residual toners are electrostatically transferred to the photosensitive drum 1 at the contact zone between the photosensitive drum 1 and the intermediate transfer belt 20 and in the vicinity thereof, thus they are removed from the intermediate transfer belt 20.

Figure 2:
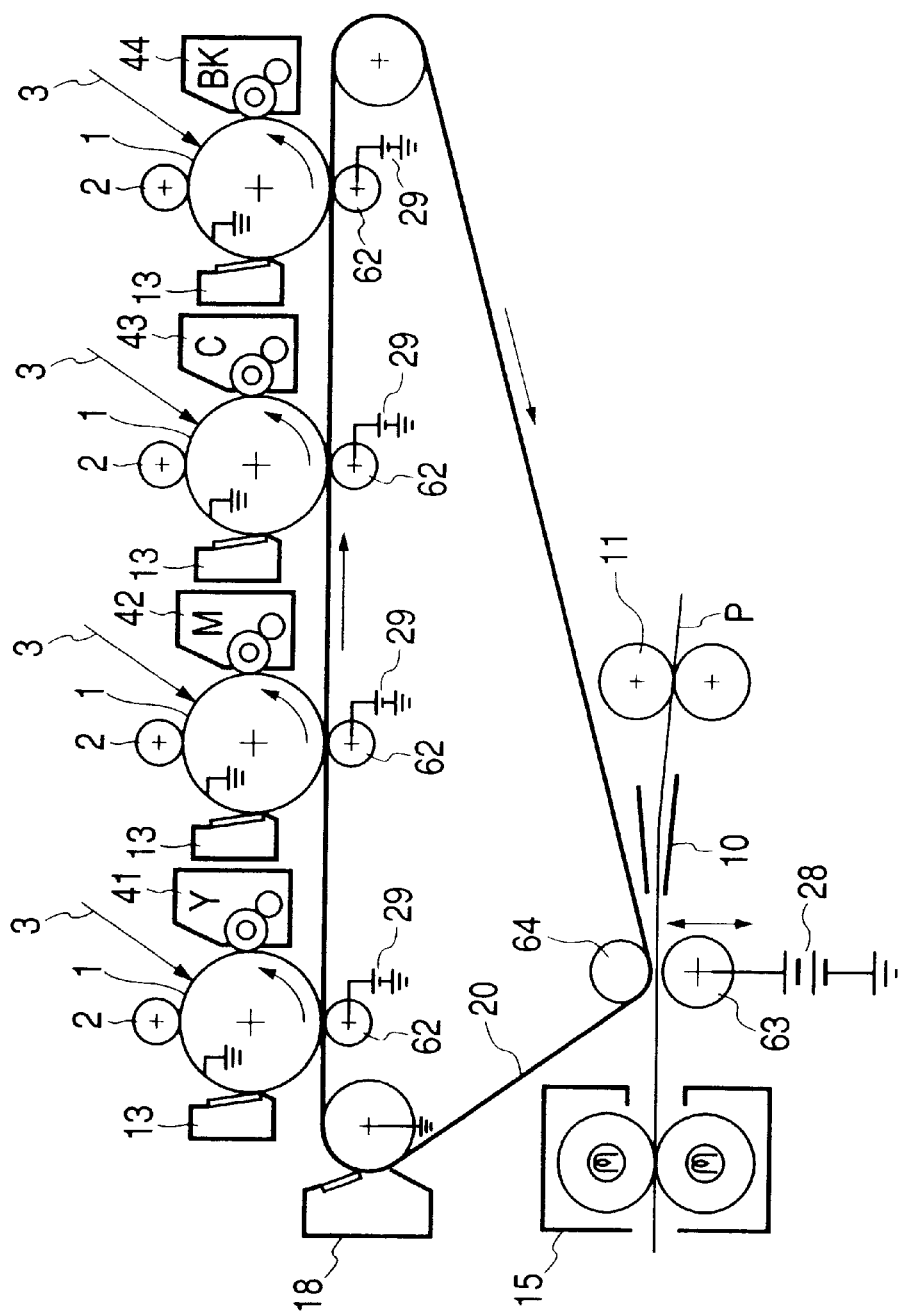
FIG. 2 schematically illustrates the construction of another image-forming apparatus according to the present invention.
Figure 3:
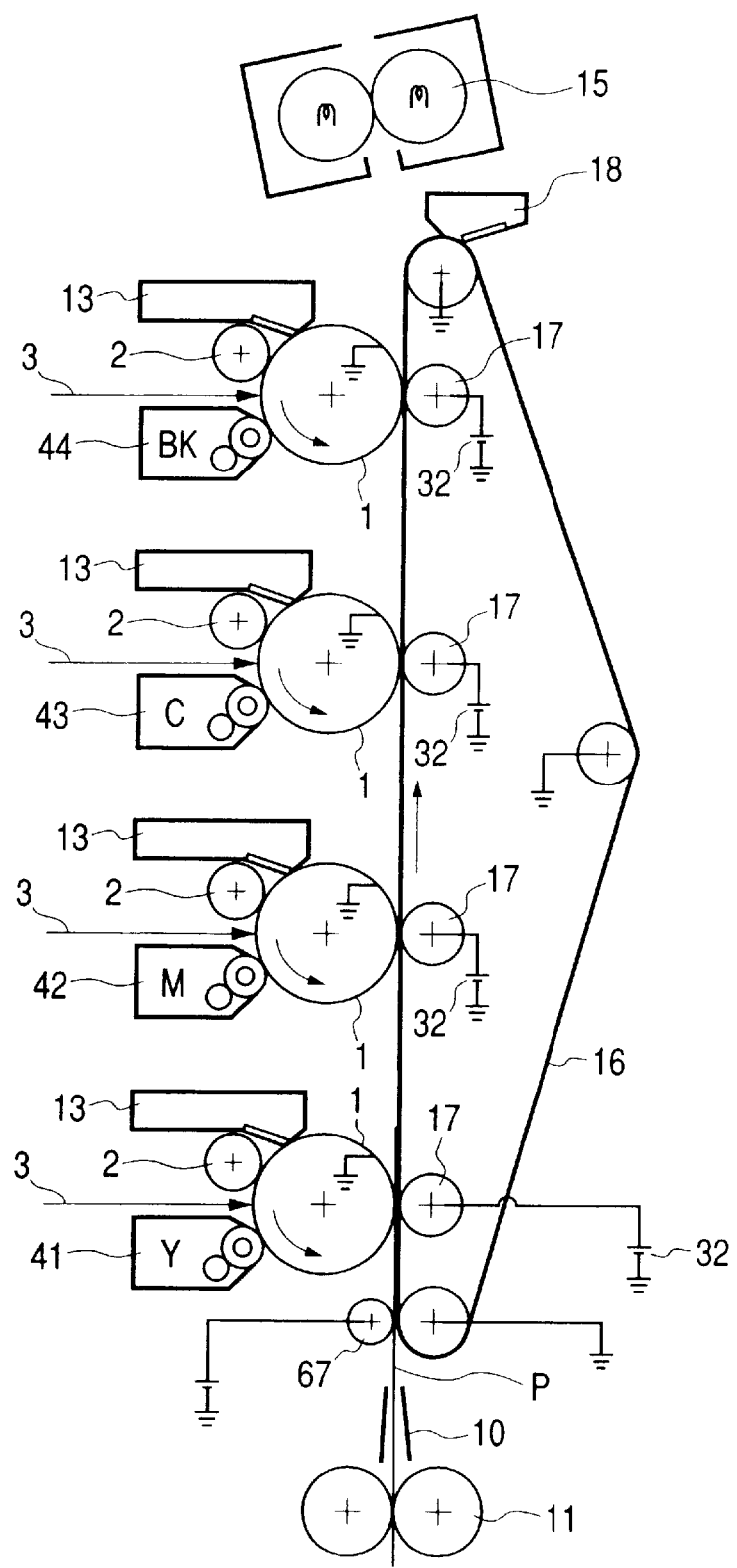
FIG. 3 schematically illustrates the construction of still another image-forming apparatus according to the present invention.

Additional examples of the image-forming apparatus of the present invention are further shown in FIGS. 2 and 3. The apparatus shown in FIGS. 2 and 3. have photosensitive drums 1 in the number corresponding to developers necessary for the formation of full-color images, and have such an advantage that the printing speed of color printing can dramatically be improved. In these drawings, members denoted by like reference numerals indicate the same members as those in FIG. 1.

FIG. 2 shows an example in which the belt-shaped transfer member of the present invention is used as an intermediate transfer belt. Visible images formed on the photosensitive drum 1 in the same manner as that shown in FIG. 1 are sequentially transferred to a intermediate transfer belt 20, which are superimposed thereon and thereafter, under application of a bias with a polarity reverse to that of toners by means of a secondary transfer roller 63, collectively transferred to a transfer material P. Developers having remained on the intermediate transfer belt are removed by a cleaning assembly 18.

FIG. 3 shows an example in which the belt-shaped transfer member of the present invention is used as a transfer material transport belt. A transfer material P is, under application of an attraction roller 67, attracted to and transported on a transfer material transport belt 16. Individual color toner images formed on photosensitive drums 1 are, under application of a bias with a polarity reverse to that of toners by means of a transfer roller 17, sequentially transferred to and superimposed on the transfer material P attracted onto the transfer material transport belt, and thereafter thermally fixed by means of a fixing assembly 15. Reference numeral 32 denotes a bias power source.

EXAMPLES

The present invention will be described below in detail by giving Examples. In the following Examples, "part(s)" is by weight.

Example 1

| | |
|---|---|
| Polyether sulfone | 100 parts |
| High-conductive carbon black | 16 parts |

The above materials were kneaded by means of a twin-screw extruder, and the carbon black was thoroughly uniformly dispersed in the binder so as to provide the desired electrical resistance. Thereafter, the kneaded product was made into pellets of about 1 to 2 mm in diameter to obtain an extrusion material (1). Next, this extrusion material (1) was put into the hopper 120 of the single-screw extruder 100 shown in FIG. 4, and was extruded with heating to form a melt. The melt was subsequently brought to the circular die 140 for extruding a cylindrical single-layer product, having a die-slit external diameter of 100 mm and a die gap of 1 mm. Then, air was blown from the gas inlet passage 150 while the melt was extruded from the die, to scale-up inflate the extruded product into a cylindrical extruded product of 185 mm in external diameter and 150 $\mu$m in thickness as final shape dimensions 180. This product was further cut in a belt width of 320 mm to obtain a seamless belt-shaped transfer member 190. This is designated as an belt-shaped transfer member (1).

Figure 9:
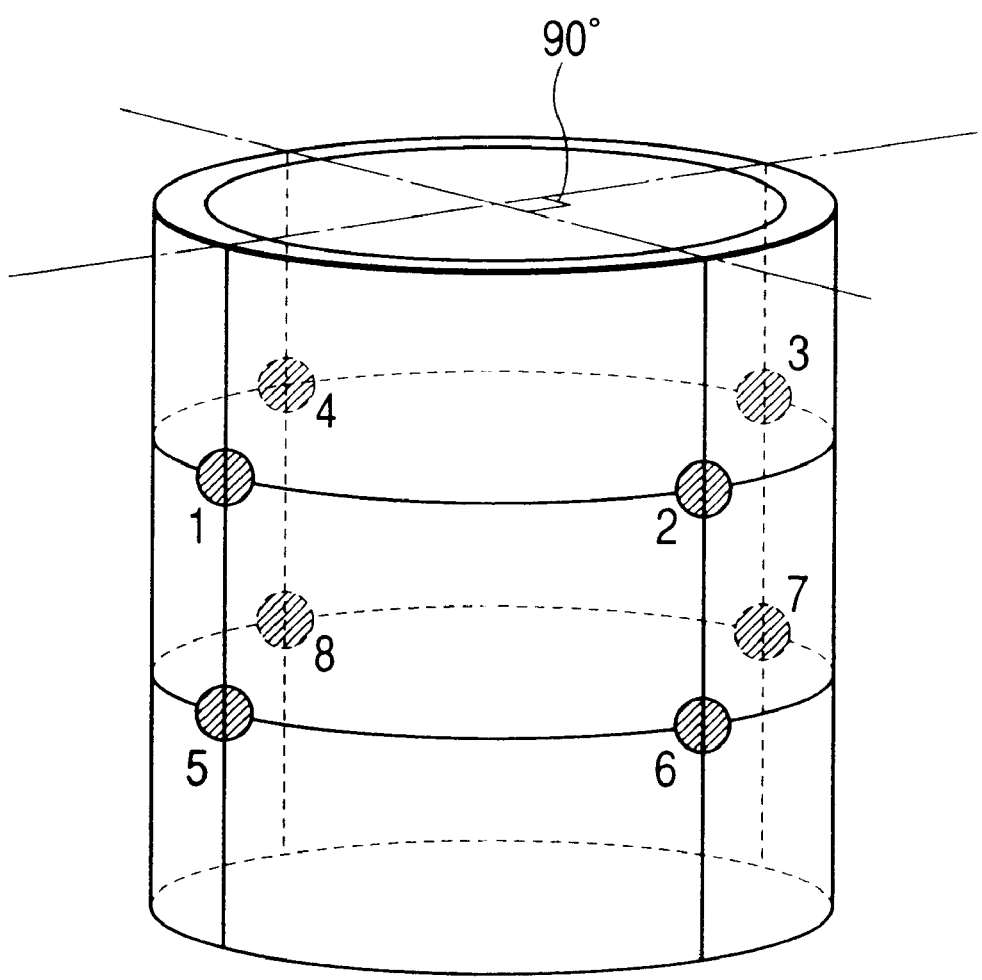
FIG. 9 illustrates an example of positions at which electrical resistance is measured.

The modulus in tension of this belt-shaped transfer member (1) was 2,660 MPa; and the volume resistance under application of 100 V, $6 \times 10^5$ $\Omega$. Also, the electrical resistance of the belt-shaped transfer member (1) was measured at four spots in its peripheral direction and at two spots in its axial direction at each position of the four spots, eight spots in total, as shown in FIG. 9, and any scattering of electrical resistance in one belt-shaped transfer member was examined, where the scattering of measurements at the eight spots was within one figure in respect of both the volume resistance and the surface resistance. Scattering in the measurement of thickness at the same positions was within 150 $\mu$m±15 $\mu$m. In visual observation of the belt-shaped transfer member (1), neither foreign matter nor a faulty extrusion, such as granular structure and fish eyes was seen on its surface. Also, the breaking extension of the extrusion material (1) was 7.5%; and the tensile break strength, 88 MPa.

This belt-shaped transfer member (1) was set as an intermediate transfer belt in the full-color image forming apparatus shown in FIG. 1. Using two color toners of cyan-magenta and cyan-yellow, respectively, blue and green character images and line images were printed on 80 g/m$^2$ paper in an environment of 23° C./60% RH. In this apparatus, the tension per 1 cm of width of the intermediate transfer belt was 1.1 N.

The respective images were visually inspected for evaluation on color misregistration and spots around line images. As a result, there were no problems found in the evaluation, showing good results.

Next, a full-color image 20,000-sheet continuous running test was made using as a method for cleaning the intermediate transfer belt a cleaning-at-primary-transfer (primary-transfer simultaneous cleaning) method in which electric charges having a polarity reverse to the normal charge were imparted to the secondary transfer residual toners to return them to the photosensitive member.

After the running, spots around line images and color misregistration were seen very slightly, compared with initial-stage images, and good images were obtainable. Moreover, none of toner filming, cracking, scrape and wear occurred at the surface of the intermediate transfer belt. Thus, the belt was judged to have a sufficient durability.

Example 2

| | |
|---|---|
| Polyacetal | 100 parts |
| High-conductive carbon black | 16 parts |
| Antioxidant | 0.3 part |

The above materials were kneaded and dispersed by means of a twin-screw extruder to prepare a uniform kneaded product, which was then made into pellets of about 1 to 2 mm in diameter, obtaining an extrusion material (2).

Next, this was continuously extruded by means of the extruder shown in FIG. 5, using a circular extruder die 141 having a die-slit external diameter of 200 mm and a die gap of 1.2 mm, and was simultaneously taken off at a speed higher than the extrusion speed. Then, the cylindrical extruded product obtained was cut in the desired length to obtain a belt-shaped transfer member (2) of 185 mm in external diameter, 320 mm in belt width and 100 μm in thickness.

The modulus in tension of this belt-shaped transfer member (2) was 2,250 MPa; and the volume resistance under application of 100 V, $1.7 \times 10^6$ Ω. The values of tensile break strength and breaking extension of the extrusion material (2) were 61 MPa and 5.0%, respectively.

The scattering of electrical resistance of this transfer material transport belt (2) was within one figure, and the scattering of thickness was also as good as 100 μm±8 μm.

Next, using this belt-shaped transfer member (2), printing was tested in the same manner as in Example 1. As a result, the color aberration was slightly seen as compared with the transfer material transport belt (1), but good results were obtained both before running and after running.

Example 3

| | |
|---|---|
| Polyvinylidene fluoride | 100 parts |
| High-conductive carbon black | 18 parts |
| Metallic soap | 2 parts |

The above materials were kneaded and dispersed by means of a twin-screw extruder to prepare a uniform kneaded product, which was designated as an extrusion material (3). The subsequent procedure of Example 1 was repeated, obtaining a belt-shaped transfer member (3) of 185 mm in external diameter, 320 mm in belt width and 200 μm in thickness.

The modulus in tension of this belt-shaped transfer member (3) was 920 MPa; the volume resistance under application of 100 V, $6 \times 10^5$ Ω; the scattering of electrical resistance, within one figure; and the scattering of thickness, as good as 200 μm±8 μm. Also, the breaking extension of the extrusion material (3) was 20%; and the tensile break strength, 100 MPa.

Next, using this belt-shaped transfer member (3), printing was tested in the same manner as in Example 1. As a result, compared with the transfer material transport belt (1), the color aberration and spots around line images were slightly seen at the initial stage and both the color aberration and the spots around line images changed slightly for the worse after running, but good images were obtainable.

Example 4

Using the same apparatus and extrusion material as those in Example 1, the extrusion was so carried out as to be in a larger blow-up inflation rate to produce a belt-shaped transfer member (4) of 330 mm in external diameter, 320 mm in belt width and 150 μm in thickness. The modulus in tension of this belt-shaped transfer member (4) was 2,900 MPa; the volume resistance under application of 100 V, $3 \times 10^6$ Ω; the scattering of electrical resistance, within one figure; and the scattering of thickness, ±11 μm.

This belt-shaped transfer member (4) was set as an intermediate transfer belt in the apparatus shown in FIG. 2. Here, the belt was at a tension of 2.0 N/cm. Thereafter, printing was tested in the same pattern and manner as in Example 1 and the same good results as those in Example 1 were obtained.

Example 5

The procedure of Example 4 was repeated except that the high-conductive carbon black was mixed in an amount of 13 parts, obtaining a belt-shaped transfer member (5) of 330 mm in external diameter, 320 mm in belt width and 150 μm in thickness. The modulus in tension of this belt-shaped transfer member (5) was 2,700 MPa; the volume resistance under application of 100 V, $2 \times 10^8$ Ω; the scattering of electrical resistance, within one figure; and the scattering of thickness, ±9 μm.

This belt-shaped transfer member (5) was set as transfer material transport belt in the apparatus shown in FIG. 3. Here, the tension of the belt was 1.0 N/cm. Thereafter, printing was tested in the same pattern and manner as in Example 1, obtaining the same good results as those in Example 1.

Comparative Example 1

| | |
|---|---|
| Ethylene-tetrafluoroethylene copolymer | 80 parts |
| Low-density polyethylene | 20 parts |
| High-conductive carbon black | 15 parts |

The above materials were kneaded and dispersed by means of a twin-screw extruder to prepare a uniform kneaded product, which was designated as an extrusion material (5). The subsequent procedure of Example 1 was repeated to produce a belt-shaped transfer member (6) of 185 mm in external diameter, 320 mm in belt width and 120 μm in thickness.

The modulus in tension of this belt-shaped transfer member (6) was 520 MPa; the volume resistance under application of 100 V, $3 \times 10^6$ Ω; the scattering of electrical resistance, within one figure; and the scattering of thickness, 125 μm±15 μm. Also, the breaking extension of the extrusion material (6) was 31%; and the tensile break strength, 35 MPa.

Next, using this belt-shaped transfer member (6), printing was tested in the same manner as in Example 1. As a result, compared with the transfer material transport belt (1), the color misregistration and the spots around line images were seen at the initial stage. Both the color misregistration and the spots around line images changed for the worse with the progress of running.

Comparative Example 2

The extrusion material (1) was extruded by means of the apparatus shown in FIG. 5, using a circular extruder die 140 having a die-slit external diameter of 180 mm and a die gap of 150 μm, not using any cooling mandrel, at a take-off speed and extrusion speed which were equal to each other. As the result, the extrusion lacked stability and it was difficult to form the extruded product in the desired dimensions. When the resultant belt was set in any image-forming apparatus, no travel stability was achievable, and accordingly no image evaluation was made.

What is claimed is:

1. A process for producing a belt-shaped member usable as a transfer belt in an image-forming apparatus, said process comprising the steps of:

melt-extruding a material, which contains a thermoplastic resin, through a circular die into a cylindrical film;

stretching the extruded cylindrical film so that the cylindrical film has a thickness smaller than a die gap of the circular die; and cutting the stretched cylindrical film into a seamless belt-shaped member having a thickness in a range of 40 μm to 300 μm and a modulus in tension of 600 MPa or higher, wherein the stretched cylindrical film is formed to have a thickness not larger than 1/3 of the die gap of the circular die.

2. A process according to claim 1, wherein the stretched cylindrical film has an external diameter in a range of 50% to 400% of an external diameter of the circular die.

3. A process according to claim 1, wherein the extruded cylindrical film is taken from the circular die at a speed higher than a speed at which the cylindrical film is extruded.

4. A process according to claim 1, wherein the cylindrical film is stretched by blowing a gas into the inside of the cylindrical film being extruded from the circular die.

5. A process according to claim 1, wherein the belt-shaped member has a modulus in tension of 2,000 MPa or higher.

6. A process according to claim 1, wherein the belt-shaped member has a modulus in tension of 2,500 MPa or higher.

7. A process according to claim 1, wherein the belt-shaped member has a volume resistance in a range of $1 \times 10^0$ Ω to $1 \times 10^{14}$ Ω.

8. A process according to claim 1, wherein the belt-shaped member has a peripheral-direction volume resistance maximum value, which is within 100 times of a peripheral-direction volume resistance minimum value.

9. A process according to claim 1, wherein the belt-shaped member has a width-direction volume resistance maximum value, which is within 100 times of a width-wise direction volume resistance minimum value.

10. A process according to claim 1, wherein the belt-shaped member has a peripheral-direction surface resistance maximum value, which is within 100 times of a peripheral-direction surface resistance minimum value.

11. A process according to claim 1, wherein the belt-shaped member has a width-direction surface resistance maximum value, which is within 100 times of a width-wise direction volume resistance minimum value.

12. A process according to claim 1, wherein the material includes a thermoplastic resin having a breaking extension of 2.0% or higher.

13. A process according to claim 1, wherein the material includes a thermoplastic resin having a tensile break strength of 30 MPa or higher.

* * * * *

UNITED STATES PATENT AND TRADEMARK OFFICE
CERTIFICATE OF CORRECTION

PATENT NO. : 6,592,803 B2
DATED : July 15, 2003
INVENTOR(S) : Akihiko Nakazawa et al.

It is certified that error appears in the above-identified patent and that said Letters Patent is hereby corrected as shown below:

<u>Title page,</u>
Item [75], Inventors, "Hidekazu Matsuda, Numazi" should read
-- Hidekazu Matsuda, Numazu --.

<u>Column 1,</u>
Line 15, "Related" should read -- Related Back-ground Art --.

<u>Column 3,</u>
Line 30, "of;" should read -- of: --; and
Line 49, "by;" should read -- by: --.

<u>Column 8,</u>
Line 45, "the both" should read -- both --.

<u>Column 11,</u>
Line 17, "3." should read -- 3 --; and
Line 28, "a" should read -- an --.

Signed and Sealed this

Twenty-seventh Day of January, 2004

JON W. DUDAS
*Acting Director of the United States Patent and Trademark Office*